(12) United States Patent
Dvorak et al.

(10) Patent No.: US 11,717,774 B2
(45) Date of Patent: Aug. 8, 2023

(54) WASTEWATER SCREEN FILTER AND CHAIN TENSIONING SYSTEM

(71) Applicant: Headworks Bio Inc., Houston, TX (US)

(72) Inventors: David Dvorak, Houston, TX (US); Jonathan Kettelkamp, Houston, TX (US); Wayne McCauley, Houston, TX (US)

(73) Assignee: Headworks Bio Inc., Houston, TX (US)

( * ) Notice: Subject to any disclaimer, the term of this patent is extended or adjusted under 35 U.S.C. 154(b) by 89 days.

(21) Appl. No.: 16/826,125

(22) Filed: Mar. 20, 2020

(65) Prior Publication Data

US 2020/0298149 A1    Sep. 24, 2020

Related U.S. Application Data

(60) Provisional application No. 62/822,788, filed on Mar. 22, 2019.

(51) Int. Cl.
*B01D 29/64* (2006.01)
*B01D 29/01* (2006.01)
(Continued)

(52) U.S. Cl.
CPC ......... *B01D 29/6484* (2013.01); *B01D 29/01* (2013.01); *B01D 29/012* (2013.01); *C02F 1/004* (2013.01); *E03F 5/14* (2013.01); *B01D 2029/033* (2013.01); *B01D 2201/08* (2013.01); *B01D 2201/54* (2013.01);
(Continued)

(58) Field of Classification Search
CPC .. B01D 29/6484; B01D 29/01; B01D 29/012; B01D 2029/033; B01D 2201/08; B01D 2201/54; C02F 1/004; C02F 2201/002; C02F 2303/16; C02F 2303/24; E02B 8/023; E02B 8/026; E02B 15/104; E03F 5/14
See application file for complete search history.

(56) References Cited

U.S. PATENT DOCUMENTS 2,782,906 A * 2/1957 Lidderdale .............. B63B 35/04
226/189
5,571,406 A * 11/1996 Mensching ........ B01D 29/6484
210/162

(Continued)

FOREIGN PATENT DOCUMENTS

KR     200327273 Y1 *  9/2003

OTHER PUBLICATIONS

"Jack" Macmillian Dictionary (Year: None).*

Primary Examiner — Liam Royce
(74) Attorney, Agent, or Firm — Schwegman Lundberg & Woessner, P.A.

(57) ABSTRACT

A screen filter for wastewater applications includes a chain tensioning system. The chain tensioning system provides a tensioning force for a screen filter chain. The chain tensioning system includes a chain adjuster device configured to tension the screen filter chain. The chain tensioning system additionally includes a sensor configured to provide a signal representative of a load applied by the chain adjuster; wherein the chain adjuster device is configured to apply a force in a direction that tensions the chain and wherein the signal provided by the sensor is representative of the force.

7 Claims, 10 Drawing Sheets

(51) Int. Cl.
*C02F 1/00* (2023.01)
*E03F 5/14* (2006.01)
*B01D 29/03* (2006.01)

(52) U.S. Cl.
CPC .... *C02F 2201/002* (2013.01); *C02F 2303/16* (2013.01); *C02F 2303/24* (2013.01)

(56) References Cited

U.S. PATENT DOCUMENTS

| | | | | |
|---|---|---|---|---|
| 6,024,228 A | * | 2/2000 | Williams | B01D 33/056 209/253 |
| 6,116,345 A | * | 9/2000 | Fontana | E21B 33/076 166/360 |
| 2015/0144544 A1 | * | 5/2015 | Davenport | B01D 29/6484 210/231 |

* cited by examiner

SECTION A-A   FIG. 3

WASTEWATER SCREEN FILTER AND CHAIN TENSIONING SYSTEM

This application is a Non-provisional Patent Application of U.S. Provisional Patent Application No. 62/822,788, entitled "WASTEWATER SCREEN FILTER AND CHAIN TENSIONING SYSTEM", filed Mar. 22, 2019, which is incorporated herein by reference in its entirety.

BACKGROUND OF THE INVENTION

The subject matter disclosed herein relates to the field of wastewater treatment, and more particularly to a screen filter for use in such applications that provides for a tensionable chain drive that may be used to remove debris with rakes within the screen filter.

In the field of wastewater treatment, a range of components are used at various stages of water capture and processing, ultimately resulting in treated water that may be used or released into the environment. One component that is often found at the initial stages of wastewater collection and treatment is the screen filter. These devices allow for water to flow into a screen which collects larger debris while allowing the strained water to flow through for further filtering and treatment. In one type of screen filter, one or more chain-mounted rakes are continuously moved over a screen field to remove the debris that is collected from the water. Typically, the one or more chains are moved by a drive assembly over sprockets, so that the collection and raking operations may be performed without operator intervention, at least during times when water is flowing through the filter. The debris is scraped from the rakes and may be disposed of accordingly.

Persistent problems in such devices may result from wear on the moving elements, particularly on the chain and on the sprocket assemblies used to guide the chain. Such wear may result in the loss of efficiency of the drive used to move the rakes, and may be costly. There is a need, therefore, for improved techniques for managing the wear and tear of the chain drive and related components.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, screen filter for wastewater applications includes a chain tensioning system. The chain tensioning system provides a tensioning force for a screen filter chain. The chain tensioning system includes a chain adjuster device configured to tension the screen filter chain. The chain tensioning system additionally includes a sensor configured to provide a signal representative of a load applied by the chain adjuster; wherein the chain adjuster device is configured to apply a force in a direction that tensions the chain and wherein the signal provided by the sensor is representative of the force.

In a second embodiment, method for making a screen filter for wastewater applications is provided. The method includes providing a chain adjuster device configured to tension the screen filter chain. The method further includes providing a sensor configured to provide a signal representative of a load applied by the chain adjuster; wherein the chain adjuster device is configured to apply a force in a direction that tensions the chain and wherein the signal provided by the sensor is representative of the force.

In a third embodiment, a non-transitory computer readable medium comprises instructions that when executed cause a processor to actuate a chain adjuster device. The instructions further cause the processor to receive a signal from a sensor configured to provide the signal representative of a load applied by the chain adjuster device and to stop actuating the chain adjuster device when a desired chain tension is derived.

The present invention provides for a novel chain tensioning system disposed in a screen filter. The invention offers an improved tensioning control for the chain, such that a tensioning force is applied more evenly, thus minimizing or eliminating mechanical stress between components, including components disposed at opposing ends of the chain. In one embodiment, the chain tensioning system may include one or more sensors, such as load cells. As the chain becomes more "loose" due to wear, a tensioning force may be adjusted to compensate for any slack by monitoring the load cells. In one example, a chain adjuster device, such as a jack, may be monitored in use via the load cell(s). As a desired loading is reached, the actuation of the jack may be stopped, and the chain and related systems secured to the desired loading. By providing for an improved chain tension, the efficiency of the chain drive may be improved, and component wear may be minimized.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
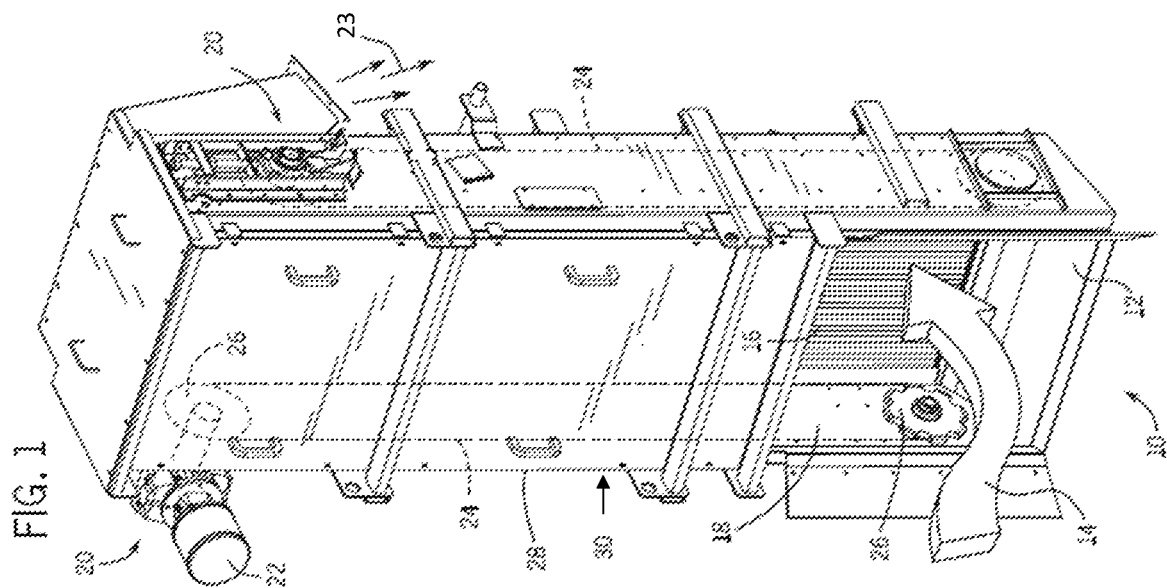
FIG. 1 is a perspective view of an embodiment of screen filter for wastewater applications employing a chain tensioning system.

FIG. 1 is a perspective view of an embodiment of a screen filter 10 that would be used in a wastewater treatment facility. As will be appreciated by those skilled in the art, the screen filter may be positioned vertically or at an angle at an entrance side of a collection point or treatment facility. An open end 12 of the screen filter 10 receives a flow of water as indicated by arrow 14 through a filter screen 16 which may be seen in the interior volume 18 in the image of FIG. 1. The filter screen 16 may stop large debris from flowing through the filter 10 to downstream components, while allowing water to flow through for subsequent filtering and treatment.

Also depicted is a chain drive assembly 20 including a motor, such as an electric motor 22 used to drive one or more chains 24 (depicted as a broken line). The chains 24 may use sprockets, such as a sprocket 26, to move a rake useful in removing debris that may collect on the filter screen 16. The debris may be collected and disposed of appropriately, as depicted by arrows 23. Unfortunately, wear on the chain 24 or improper chain 24 tensioning may result in certain "slackness," thus reducing overall efficiency of the chain drive assembly 20 and increasing wear on components of the screen filter 10. Advantageously, the chain 24 is mounted on a drive side wall 28 having a drive side chain tensioning system shown in more detail in the figures below. Likewise, a chain 24 is mounted on an opposite side wall 30 having a wall side chain tensioning system shown in more detail in the figures below. The chain tensioning systems may enable a more efficient tensioning of the chain 24, thus improving chain drive 20 efficiency and minimizing wear and tear on components of the screen filter 10.

Figure 2:
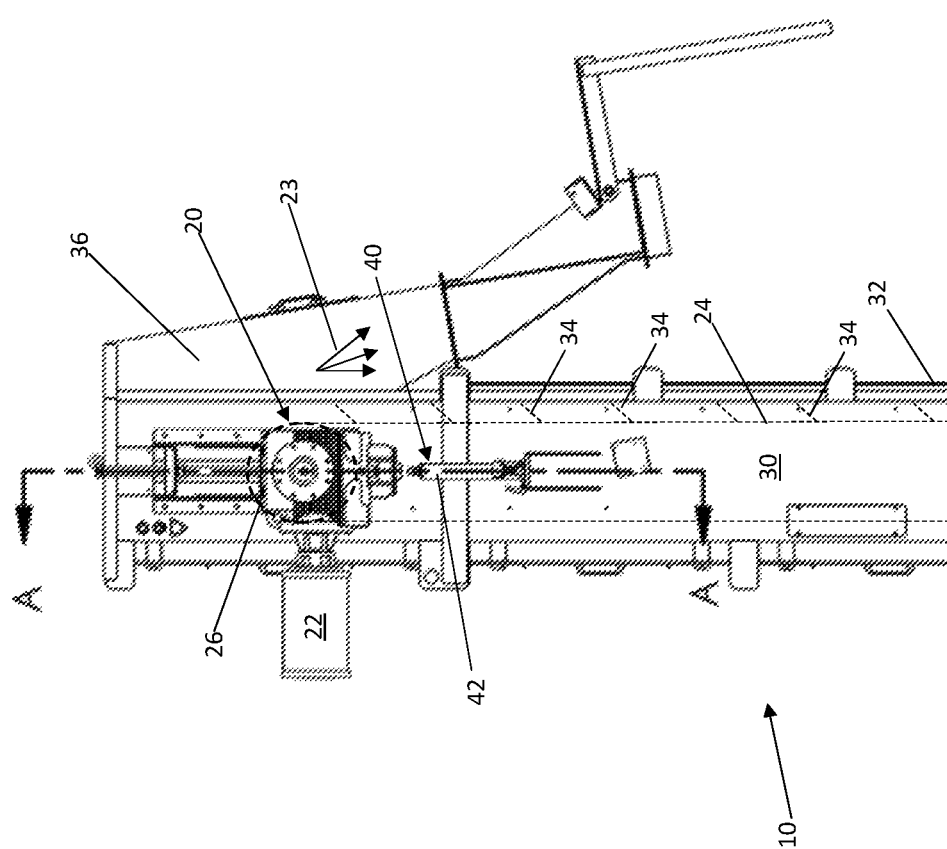
FIG. 2 is a side view of an embodiment of the screen filter for wastewater applications of FIG. 1, showing details of a chain tensioning system.

FIG. 2 is a side view of an embodiment of the screen filter 10 of FIG. 1. More specifically, the figure depicts the side wall 30 having the drive assembly 20 with the electric motor 22. A debris plate 32 is disposed near a bottom downstream side of the filter screen 16 (shown in FIG. 1) and serves to collect the debris that may be present in the wastewater that flows through the filter. Above the debris plate 32, one or more plate sections may be provided for allowing the debris to be raised on the chain 24 and rakes 34 positioned along the chain. Depending upon the design of the screen filter, and its length, one or many such rakes 24 may be provided along the length of the chain. These rakes 24 are raised on the downstream side of the interior volume of the screen filter and lowered along the upstream side. The rakes 24 progressively advance over the debris plate 32 and remove any debris that has collected there, raising it to an upper end of the screen filter 10. A scraper assembly may contact the rakes 24 at on a debris chute 36 end of the screen filter 10 and pushes the debris into the debris chute 36 as shown by the arrows 23.

As shown in FIG. 2, the chain 24 is wound around sprockets 26 and is guided by the sprockets at lower and upper ends of the screen filter 10. In most applications, two such chains 24 will be provided, one on either side of the assembly. The chains 24, then, span these two sprockets 26 and over a length of the screen filter 10. The chains 24 are driven by a gear reducer 38 at the upper end of the screen filter, which is itself driven by the electric motor 22. This mechanism may run continuously, or at least during periods when wastewater is being received to continuously remove debris from the water and maintain the screen filter in an unobstructed operative condition. In the depicted embodiment, a chain tensioning system 40 includes a chain adjuster device 42 (e.g., adjusting jack) and may be used to maintain a more suitable chain 24 tension. Indeed, should the chain 24 experience slack, the chain tensioning system 40 may be actuated to "take up" the slack and provide for uniform chain tension. A similar chain tensioning system 40 may be disposed on the opposite chain drive side wall 28. Accordingly, the chain tensioners may improve efficiency of the chain drive 20 and reduce wear of components of the screen filter 10.

Figure 3:
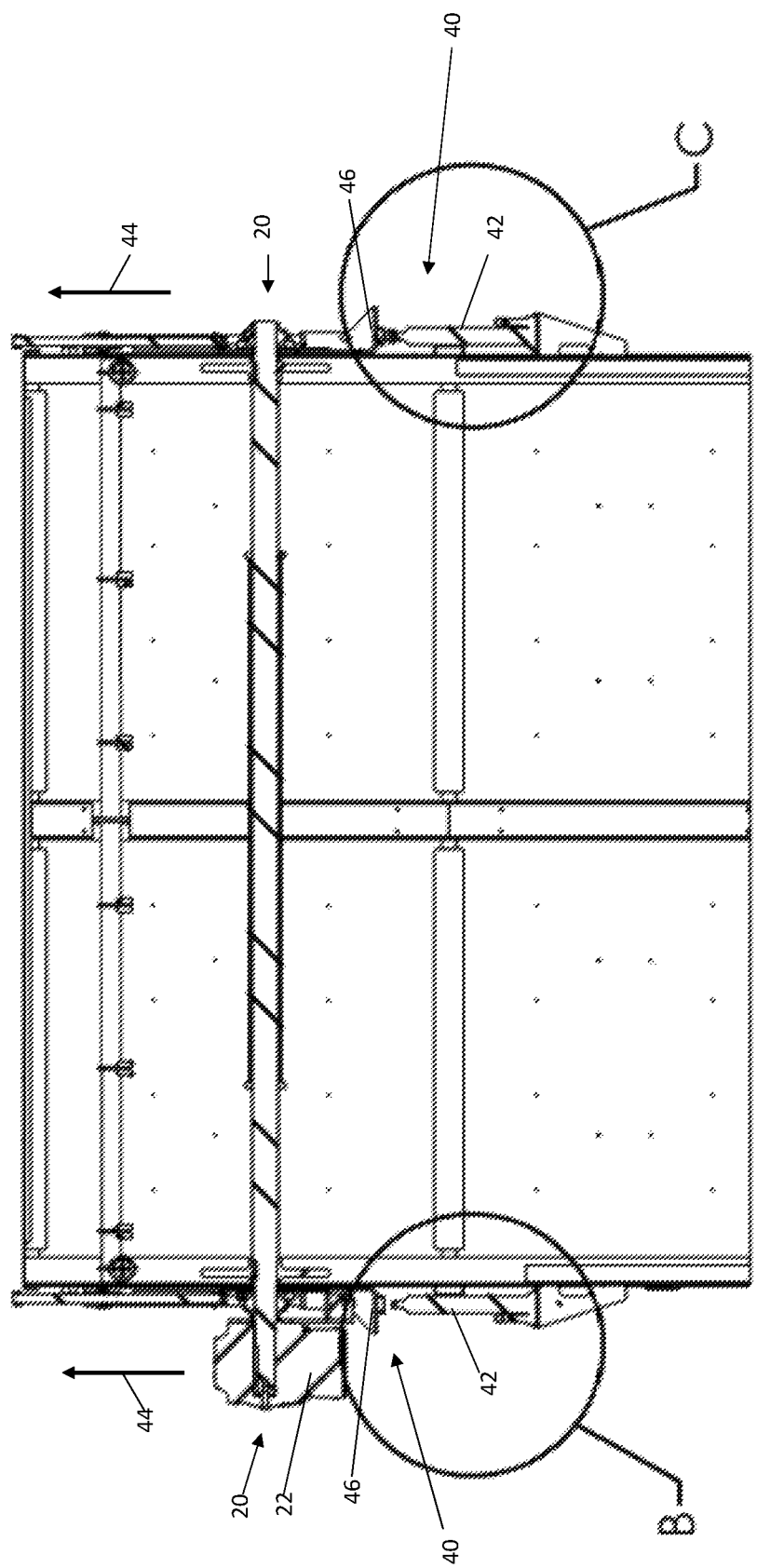
FIG. 3 is a more detailed section view of an embodiment the chain tensioning system of FIG. 2, including a chain adjuster device.

FIG. 3 is a section A-A view of an embodiment of a top portion of the screen filter 10 illustrating further details of the chain tensioning systems 40, including the chain adjuster device 42. In use, the chain 24 "stretch" over time. Accordingly, the chain tensioning systems 40 may be used to tension the chain 24 by moving the chain 24 and connected systems, e.g., systems 20, motor 22, in an upwards direction 44. More specifically, the adjuster device 42 is actuated so that a component of the adjuster device 42 abuts against a lower assembly portion 46 of the systems 20.

The techniques described herein provide for using one or more load cells to monitor a load as the adjuster device 42 applies a force to the lower assembly portion 46. As the load increases, the chain's slack may be removed, until a more optimal tension for the chain 24 is reached. In some embodiments, once the desired tension, as measured by the load, is achieved, the adjuster device 42 may be reset so that it no longer abuts the lower assembly portion 46 and the chain 24 may be kept in place (e.g., prevented from moving down) by refastening certain fasteners, such as bolt and nuts, screws, latches, and so on.

Figure 4:
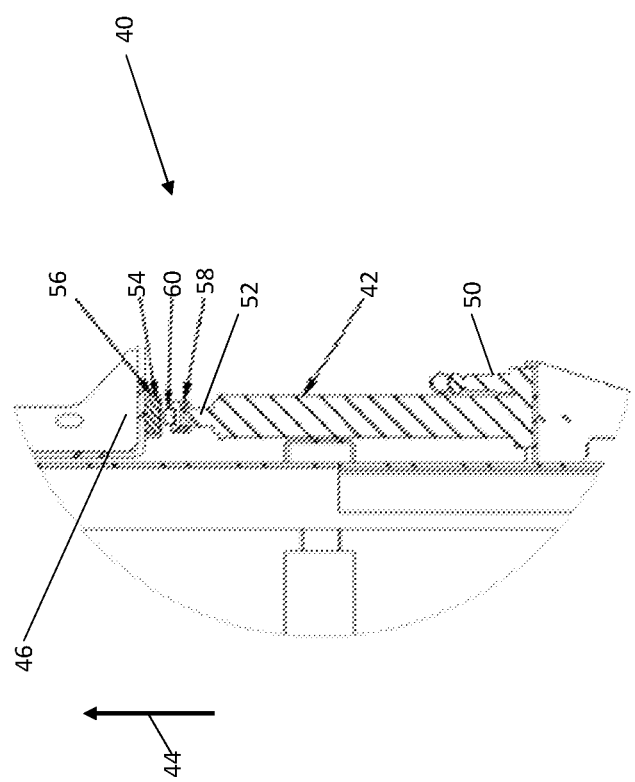
FIG. 4 is a more detailed view of an embodiment the chain tensioning system of FIG. 3, including various components of the chain tensioning system, including a load cell.

FIG. 4 is a side view illustrates embodiments of certain of the components of the chain tensioning system 40 in more detail, including the chain adjuster device 42. In the depicted embodiments, the chain adjuster device 42 may be manually actuated and/or actuated via a controller, e.g., via a piston assembly 50, to raise a piston or ram 52 so that the ram 52 abuts against a take up spacer 54 disposed in a pocket 56 of the lower assembly portion 46.

As part of the chain tensioning systems 40, a load cell seat assembly 58 may include a load cell 60. The load cell seat assembly 58 may be removable. That is, before starting the chain 24 tensioning process, the load cell seat assembly 58 may be disposed onto the ram 52. For example, the user may place the load cell seat assembly 58 onto the ram 52, and subsequently actuate the chain adjuster device 42, e.g., via the piston assembly 50. As the ram 52 moves in the upward direction 44, the load cell 60 may abut against the take up spacer 54. As more force is applied by the ram 52, the load cell 60 may register increasing load measurements. The operator may continue actuating the chain adjuster device 42 until a desired load reading incoming from the load cell 60 is achieved. In some embodiments, the load cell 60 may be communicatively coupled, via wired or wireless techniques (e.g., Bluetooth, Wi-Fi, mesh networks) to a load meter that may then provide the load readings or load graph. The load meter may include an application on a tablet, laptop, smart phone, smart watch, and the like, and/or a dedicated meter having a built-in display suitable for presenting the load readings and/or loading graph. It is to be noted that in some embodiments the load cell 60 may be permanently placed as part of the lower assembly portion 46. Multiple load cells 60 may also be used, and techniques such as an average and/or median may be used to determine when the desired load has been achieved.

Figure 5:
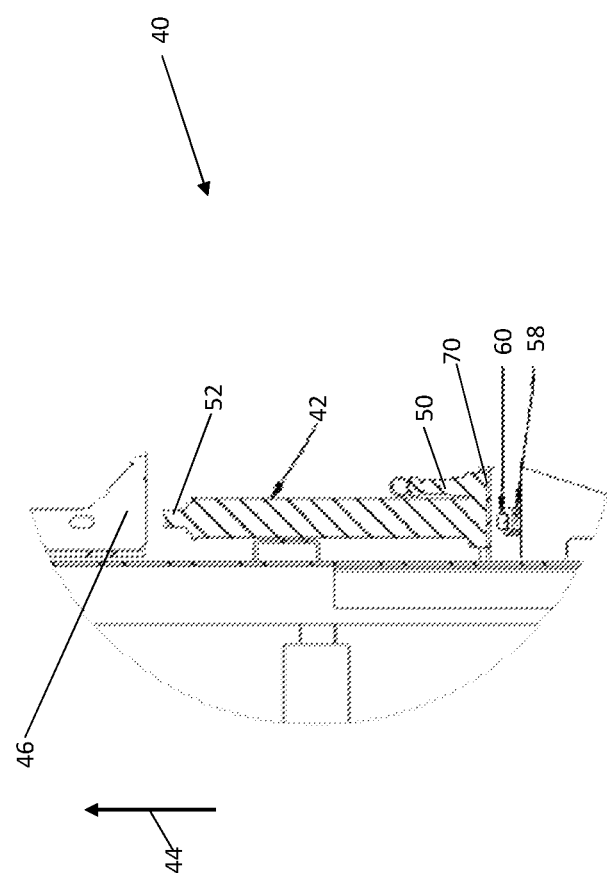
FIG. 5 is a detailed view of embodiments certain components of the chain tensioning system where the load cell is disposed on a different location.

In another embodiment, the load cell 60 may be disposed on a base of the chain adjuster device 42, as shown in FIG. 5. More specifically, FIG. 5 is a side view of embodiments of the chain tensioning systems 40 where the load cell 60 is disposed below a base 70 of the chain adjuster device 42. Because the figure includes like element with FIG. 4, the like elements are depicted using like numbers. As depicted for example only, in some embodiments it may be beneficial to dispose the load cell 60 below the chain adjuster device 42. In these embodiments the load cell 60 may measure a desired load when the chain adjuster device 42 is actuated via the base 70. It is also to be noted that in some embodiments, the chain adjuster device 42 may include a load cell 60 already built-in, for example, in the ram 52, or in any other portion or component of the chain adjuster device 42. As mentioned earlier, the load cell 60 may then be used to measure a loading as the chain adjuster device 42 is used to tension the chain 24.

Figure 6:
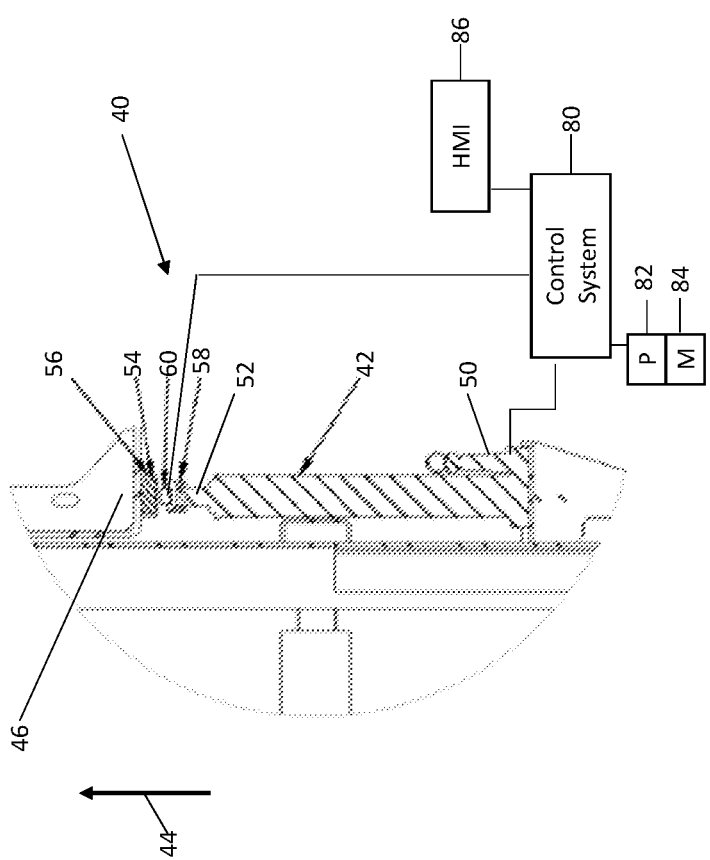
FIG. 6 is block view of an embodiment of a control system suitable for controlling the chain tensioning system.

Turning now to FIG. 6, the figure illustrates an embodiment of a control system 80 that may be used to automate or to partially automate the application of the chain adjuster device 42. The control system 80 may be included in the chain tensioning systems 40 and may include one or more processors 82 and a memory 84. The memory 84 may store computer code or instructions executable via the processor(s) 82. The control system 80 may also include a human machine interface (HMI) 86 suitable for receiving inputs and for providing certain displays, such as load measurements. In the depicted embodiment, the control system 80 may be communicatively coupled to the load cell 60 and/or operatively coupled to the chain adjuster device 42. In full automated use, the user may use the HMI 86 (e.g., that may include a display) to enter a desired loading value and may the initiate chain 24 tensioning operations. The control system 80 may then actuate the chain adjuster device 42 to move the ram 52 in the upward direction 44.

As the ram 52 abuts against the against the take up spacer 54, the load cell 60 may provide signals to the control system 80 representative of the load being applied by the chain adjuster device 42. The control system 80 may then continue actuating the ram 52 until a desired load is achieved. Once the desired load is achieved, the control system 80 may stop actuation of the ram 52 and provide a log of the chain tensioning activity, including load applied. The user may then secure the systems 20 as mentioned above to maintain the desired chain 24 tension, and then the control system 80 may be used to lower the ram 52 to a stowing position. The chain adjuster device 42 may be driven by hydraulic power (e.g., hydraulic jack), electric power, and so on, controllable via the control system 80 to move the ram 52 up and/or down.

In a semi-autonomous mode, the control system 80 may be used to provide indication of a desired loading while the user may manually actuate the chain adjuster device 42 to move the ram 52 in the upward direction 44. That is, the user may actuate the piston assembly 50 manually but the control 80 may monitor the loading as the ram 52 abuts against the take up spacer 54. Once the desired loading is achieved, the HMI 86 may provide a visual and/or audio indication that the loading is now representative of a "good" chain 24 tension. For example, lights may be used, where green represents the good loading, yellow represents a smaller than desired loading, and red represents no loading or too much loading. The user may monitor the lights as they start red, go to yellow when the ram 52 abuts against the take up spacer 54, and stop actuating the chain adjuster device 42 once the lights go green. Likewise, sound, including voice output, may provide similar feedback.

Figure 7:
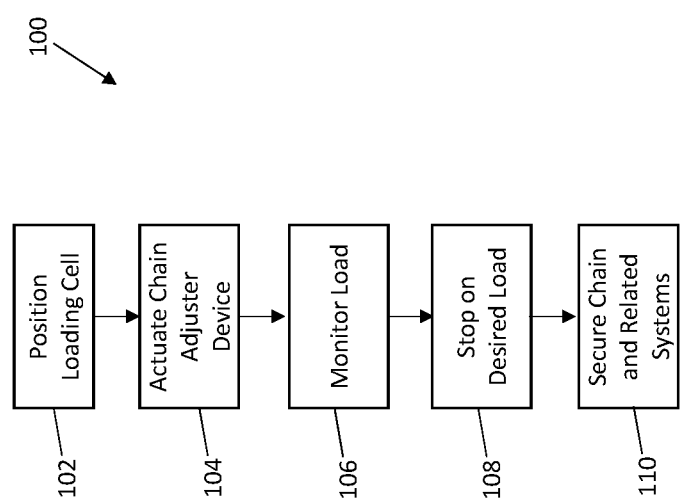
FIG. 7 is flowchart of an embodiment of a process suitable for using the chain tensioning system.

FIG. 7 is a flowchart depicting an embodiment of a process 100 suitable for chain tensioning the screen filter 10. The process 100 may be implemented as computer code or instructions stored in the memory 84 and executable by the processor 82. In the depicted example, the process 100 may first position (block 102) the loading cell 60. For example, the load cell seat assembly 58 having the loading cell 60 may be disposed on top of the ram 52 of the chain adjuster device 42. The process 100 may then actuate (block 104) the chain adjuster device 42. For example, the control system 80 may be used to provide hydraulic power, electric power, compressed air, and so on, to the chain adjuster device 42 to actuate the chain adjuster device 42 (e.g., move the chain adjuster device 42 up and/or down). Likewise, a human operator may manually actuate (block 104) the chain adjuster device 42 via the piston assembly 50.

The process 100 may then monitor (block 106) loading as the ram 52 abuts against the take up spacer 54. For example, the process 100 may use the one or more load cells 60 to monitor loading as the ram 52 moves in the upwardly direction 44. Once a desired load is reached, the process 100 may then stop (block 108) actuating the chain adjuster device 42. The desired load may be provided by the manufacturer of the screen filter 10 and may take into account hours of operation. For example, at table that lists a desired load based on how many hours the chain 24 has been used after installation and/or after the latest tensioning activity may be provided. The process 100 may then secure (block 110) the chain 24 and related systems, e.g., system 20 via bolts, screws, fasteners, and so on. The process 100 may then lower the ram 52 once the chain 24 and related systems are secured (block 110). By providing for improved chain tensioning systems and methods, the techniques described herein may enable a more efficient operation of the screen filter 10.

Figure 8:
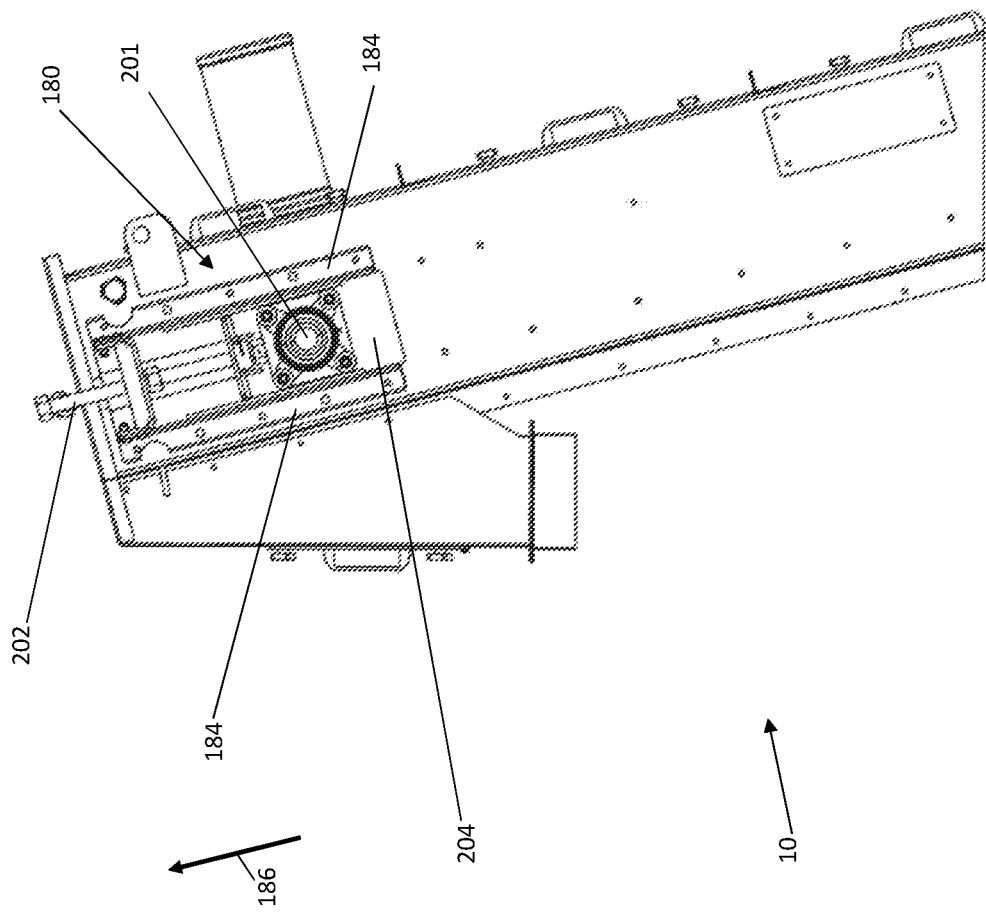
FIG. 8 is a side view illustrating an embodiment of the screen filter that includes a chain adjuster device.

Other chain adjuster devices may be used. For example, and turning now to FIG. 8, the figure is a side view illustrating an embodiment of the screen filter 10 that includes a chain adjuster device 180. In the depicted embodiment, a drive shaft 201 used to drive the chain 24 may be moved via tensioner(s) 202 included in the chain adjuster device 180. For example, the drive shaft 201 may be disposed on a slide plate 204 that slides with respect to a fixed bracket assembly 184. Sliding the slide plate 204 in a direction 186 may thus increase tension on the chain 24.

Figure 9:
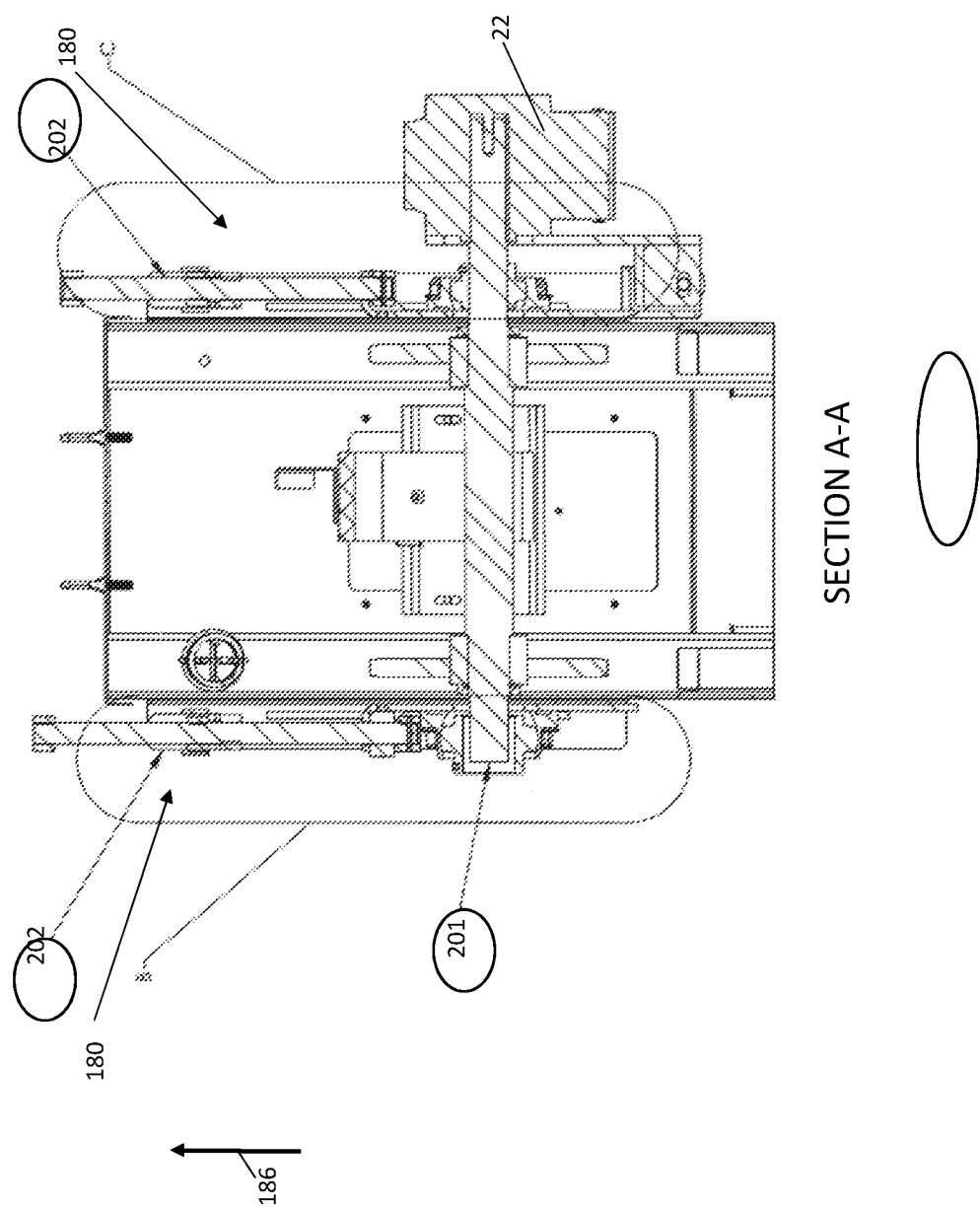
FIG. 9 is a front view illustrating two of the chain adjuster devices of FIG. 8 disposed on opposite sides of the screen filter.

FIG. 9 illustrates two of the chain adjuster devices 180 disposed on opposite sides of the screen filter 10. As mentioned earlier the chain adjuster devices 180 may adjust chain tensioning by moving the shaft 201. Movement of the shaft 201 in the direction 186 may increase chain 24 tension. It is also to be noted that the chain adjuster devices 42 and 180 operate while the screen filter 10 is off. The user may tension a first side B of the screen filter 10, and then move to an opposite side C of the screen filter 10 and tension the opposite side.

Figure 10:
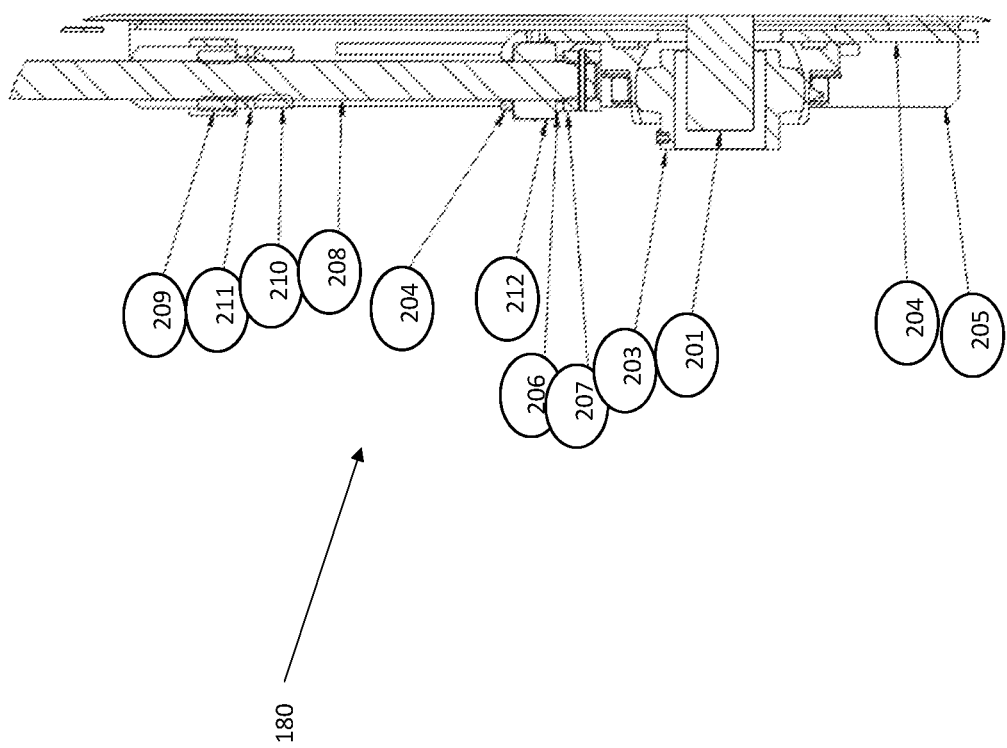
FIG. 10 is a side sectional view of and embodiment of the chain adjuster device of FIG. 8 illustrating further details.

FIG. 10 is a side sectional view of and embodiment of the chain adjuster devices 180 illustrating further details. The tensioner 20 includes a bearing 203 attached to the drive shaft 201 and mounted to the slide plate 204 which moves within a guide way 205 in the frame of the take up. The slide plate rest on a washer 206 which in turn rests on a nut 207. The position of the nut is controlled by a threaded rod (acme or otherwise) 208 to which it may be pinned. A nut 209 may be attached to the tensioner frame that the threaded rod 208 passes through. Therefore as the rod turned the position of the nut that the slide plate ultimately rest on changes. An additional nut 210 and washer 211 may also be provided to lock the position of the threaded rod 208.

The slide plate 204 may rest on a sensor 212. The sensor 212 may be a force transducer, e.g., Load cell, Donut Load cell, Load Washer, and/or or Strain Gauged hollow cylinder, which in turn may rest on a washer 206. The washer then in turn rest on a nut. The tensioners have a bearing 203 attached to the drive shaft and mounted to a slide plate 204 which moves within a guide way 205 in the frame of the take up. The slide plate 204 may rest on the sensor 212 which in turn may rest on the washer 206. The washer 206 may then in turn rest on a nut 207. The position of the nut 207 is controlled by a threaded rod (acme or otherwise) 208 to which it may pinned. A nut 209 may be attached to the tensioner frame that the threaded rod 208 passes through. Therefore as the rod 208 turns the position of the nut 207 that the slide plate 204 ultimately rest on changes. An additional nut 210 and washer 211 is provided in order to lock the position of the threaded rod. That is, in the embodiment viewed in FIGS. 8-10, tensioning may be provided via threaded bolts and nuts, and a slide plate (e.g., plate 204) may abut against the sensor 212 to measure a loading. It is to be noted that the sensor 212 may be used in lieu of or alternative to the load cell 60. A display may be used to display a value representative of the force measured by the load cell 60 and/or all sensors described herein, such as pressure values and/or torque values. For example, the load cell 60 and/or all sensors described herein may be used to drive a display, e.g., via a Wheatstone bridge, the control system 80, to view the values as the user tensions the chain.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A screen filter for wastewater applications, comprising:
   a motor,
   a screen filter chain driven by the motor and positioned on a wall of the screen filter;
   a chain tensioning system configured to provide a tensioning force for the screen filter chain, the chain tensioning system comprising:
   a chain adjuster device comprising a jack having a moveable rain configured to tension the screen filter chain by abutting against a sensor; and
   the sensor disposed to receive an end of the moveable ram and configured to provide a signal representative of a load applied by the chain adjuster;
   wherein the chain adjuster device is configured to apply a force in a direction that tensions the chain and wherein the signal provided by the sensor is representative of the force.

2. The screen filter of claim 1, wherein the sensor is selected from a group consisting of a load cell-based sensor, a Donut Load cell-based sensor, a Load Washer-based sensor, or Strain Gauged hollow cylinder-based sensor.

3. The screen filter of claim 1, wherein the jack is selected from a group consisting of a hydraulic jack, an electric powered jack, or a combination thereof.

4. The screen filter of claim 1, wherein the ram is configured to abut against a portion of an assembly having the screen filter chain to move the screen filter chain into tension.

5. The screen filter of claim 1, comprising a control system communicatively coupled to the sensor and configured to derive a value based on the signal, the value representative of a tension for the screen filter chain.

6. The screen filter of claim 5, wherein the control system is operatively coupled to the chain adjuster device to apply the force, and to stop applying the force when a user-inputted tension is reached.

7. The screen filter of claim 1, wherein the chain adjuster device comprises a manual actuator to raise the filter screen chain, to lower the filter screen chain, or a combination thereof, and wherein the sensor is communicatively coupled to a display that displays a value representative of the force.

* * * * *